Aug. 4, 1936.    W. C. SUTTON    2,049,575
SEAM FOR WOVEN WIRE FABRIC AND METHOD OF MAKING SAME
Filed April 16, 1935    2 Sheets-Sheet 1
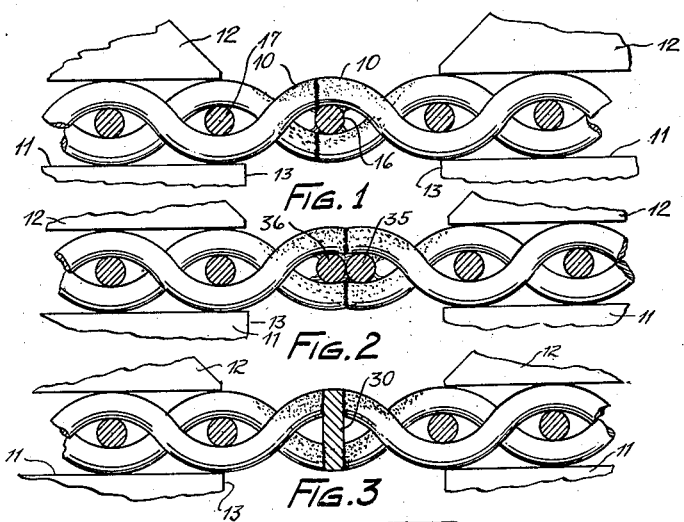
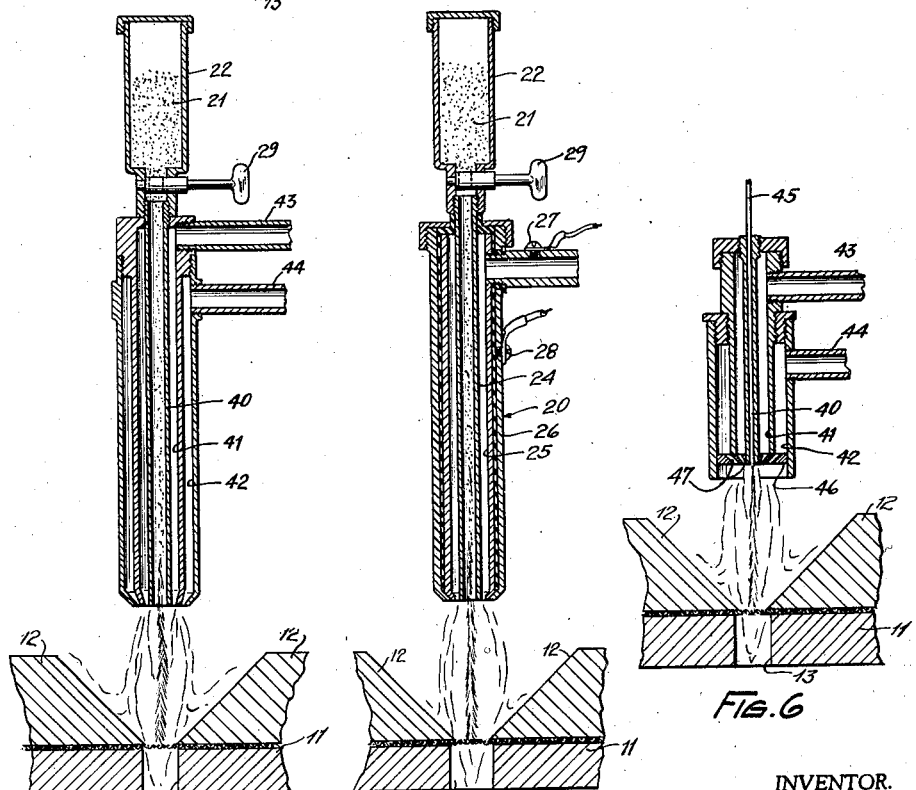
INVENTOR.
WALTER C. SUTTON
BY
Bates, Goldrick & Teare
ATTORNEYS Aug. 4, 1936. W. C. SUTTON 2,049,575
SEAM FOR WOVEN WIRE FABRIC AND METHOD OF MAKING SAME
Filed April 16, 1935 2 Sheets-Sheet 2
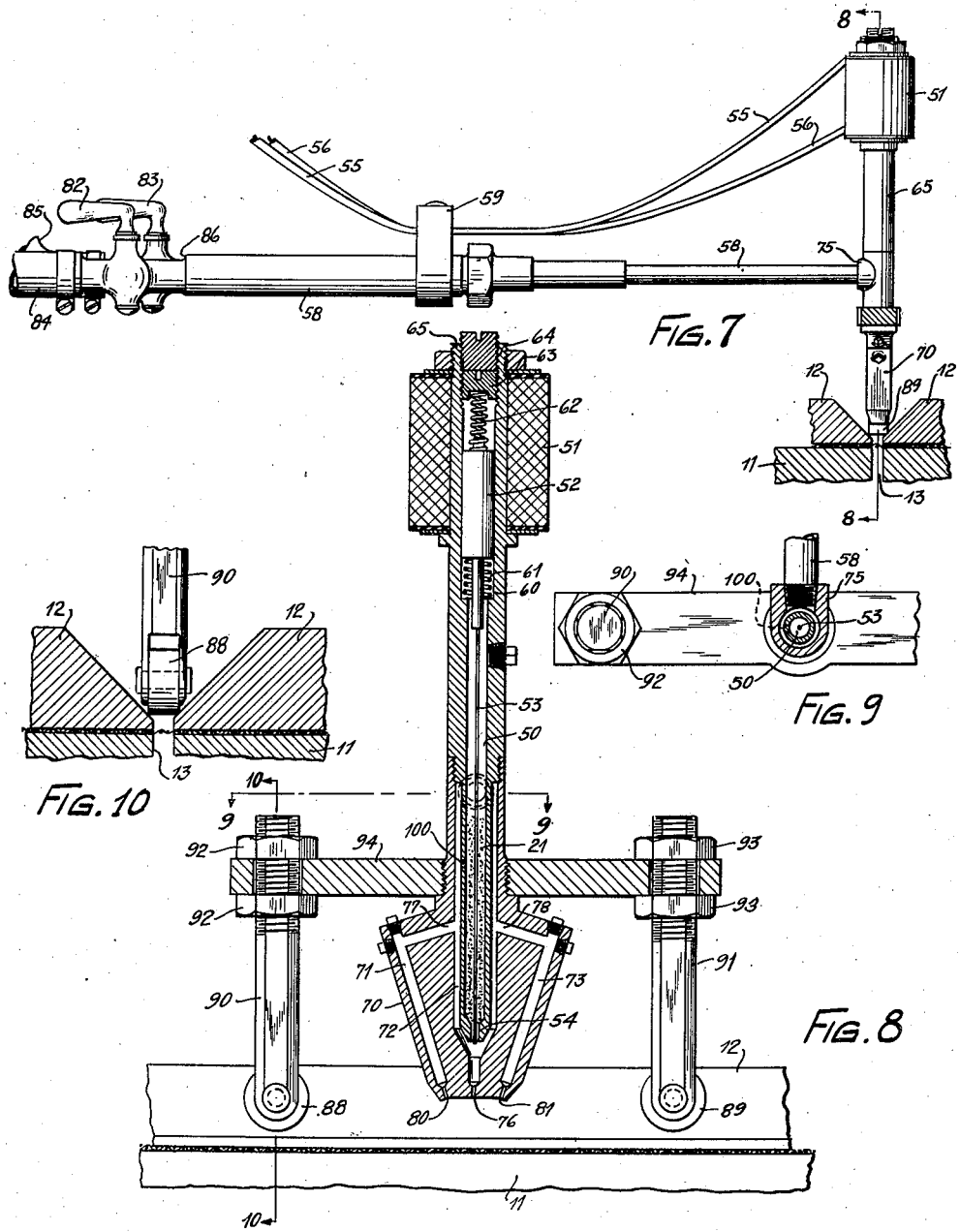
INVENTOR.
WALTER C. SUTTON
BY
Bates, Golrick & Teare
ATTORNEYS Patented Aug. 4, 1936

2,049,575

UNITED STATES PATENT OFFICE 2,049,575

SEAM FOR WOVEN WIRE FABRIC AND METHOD OF MAKING SAME

Walter C. Sutton, Shaker Heights, Ohio, assignor to The Lindsay Wire Weaving Company, Cleveland, Ohio, a corporation of Ohio Application April 16, 1935, Serial No. 16,619

8 Claims. (Cl. 245—10)

This invention relates to seams or joints for woven wire fabric and is particularly useful in connection with the manufacture of woven wire belts that are used on Fourdrinier paper making machines although it has application for other woven wire products, as well. Special problems are inherent in the manufacture of seams for Fourdrinier wires, because the seam must be sufficiently strong to withstand high stresses that are incident to the repeated bending and stretching of the fabric while it is in use, and yet it must be sufficiently open to allow the proper amount of drainage, so as to avoid a seam mark on the paper.

Many efforts have been made to reinforce the ends of the fabric adjacent the seam by the use of stitching wires, but it has been found that stitching wires clog the belt, and so subsequent efforts have been made to join the ends together solely by a soldering operation. The chief difficulty of utilizing solder alone however, for joining the ends together has been to introduce the proper amount of solder between the abutting ends of the pickets. The aligned pickets make a most desirable seam, however, for the mesh openings at the seam can then be made substantially identical in size with those in the body of the fabric.

An object of my invention is to make a seam in which the ends of the fabric may be joined by metal, such as solder without endangering the material of which the fabric is formed. The invention contemplates a method of introducing the metal at the joint so as to unite the two ends of the fabric, either directly to each other, or to an interposed uncoated strip as desired. It also contemplates a method by means of which the last two weft wires may be joined in contiguous relationship without the need for an interposed extraneous strip.

A further object of the invention is to utilize a method for introducing solder in a convenient and expeditious manner, that does not necessitate unusual skill on the part of an operator, and that requires only a minimum of preliminary operations to each end of the fabric before the final soldering operation is accomplished.

Referring now to the drawings, Figs. 1, 2 and 3 are sections through joints of woven wire fabric that are made in accordance with my invention; Figs. 4, 5 and 6 are sectional views through apparatus by means of which metal is delivered in molten condition onto the fabric; Fig. 4 representing a form in which the heat is obtained by electrical energy; Figs. 5 and 6 represent forms in which the heat is obtained by gaseous fuel, Fig. 5 having metal supplied in powder form, while Fig. 6 has metal supplied in wire form; Fig. 7 is a side elevation of a modified form of apparatus for performing my method; Fig. 8 is an end elevation of an applicator shown in Fig. 7, partly illustrated in section; Fig. 9 is a section taken on the line 9—9 in Fig. 8, and Fig. 10 is an enlarged view of a portion of the applicator adjacent the work.

My invention contemplates the making of a joint, by the addition of extraneous metal, such as solder, or other readily fusible metal, which can be sprayed or impinged onto the work, while the parts to be joined are held in engagement with each other. One form of such joint is shown in Fig. 1 in connection with woven wire fabric, such as a Fourdrinier wire, wherein the ends of the warp wires 10 are placed in abutting engagement upon a work table 11 and are held in such position by heat conducting shield weights 12. The table has a slot 13 therein beneath the joint, and has adequate space for supporting any desired number of weights to hold the fabric in seam forming position.

The picket ends of the fabric to be joined, in the manner illustrated in Fig. 1 are placed either in abutting or in overlapping engagement with each other. It is preferable to have the warp pickets on one end cut off close to the last weft wire 16 and to have the warp pickets at the opposite end project beyond the last weft wire 17, so as to make the distance between the weft-wires 16 and 17 substantially the same as that between any two adjacent weft wires in the body of the fabric. It is also desirable to align the ends of the warp pickets as closely as possible before the soldering operation is performed.

To join the ends of the fabric, I cause metal to be impinged such as by spraying upon the work, while the ends of the fabric are positioned in opposing relationship, as previously explained. The metal, such as silver solder, is transformed from a solid to a molten or vaporous condition while it is moving into contact with the work, and is then forced under fluid pressure onto the work in the region where the joint is to be made. An envelope of reducing gas may surround the solder at the point of application to prevent oxidation of the metal and thus to insure a joint having the desired degree of ductility.

The metal may be introduced in various ways onto the work. For example, in Fig. 4, I have shown an applicator that comprises an electrically heated conduit 20, through which the metal 21 is caused to flow and through which reducing gas under pressure is also caused to flow. The soldering metal is illustrated as being stored in powder form in a container 22, which is carried by the upper end of the applicator and which has an opening in its lower end that communicates with a central conduit 24. This conduit is heated by the electrical heating element, which in the form illustrated, comprises an inner wall 25, and an outer wall 26 that are made of relatively high electrical resistant material, such as is used for burners in electrical ranges, and known in the trade by the name "Nichrome".

The lower ends of the members 25 and 26 are joined together in current conducting relationship, while the opposite ends are suitably connected at 27 and 28, respectively, to a source of electrical supply. The reducing gas may be a mixture of nitrogen and hydrogen which is introduced into the space between the central conduit and the inner wall 25. The gas is caused to flow under pressure and as it flows it induces a flow of metal either in molten or vaporous condition. I have found that by supplying the reducing gas under a pressure of approximately five pounds per square inch that the molten metal is blown onto the work with sufficient force to make it adhere in a very effective manner, while any surplus is blown through the work, and thence through the slot in the work table.

The molten metal adheres to the work for the work is maintained at the proper temperature by the heat, and finds its way between the abutting warp pickets and also onto the bottom of the work so that a satisfactory joint is made, notwithstanding the fact that the metal is applied only on one side of the fabric. If desired, however, the metal may be applied to both sides of the fabric. The metal when introduced in powder form can be controlled by means of a valve 29, which is positioned at the bottom of the container, and during the soldering operation it can be agitated either by tapping lightly upon it or by vibrating it, such as by an electrically operated vibrator, as shown in Figs. 7 and 8.

A modification of my invention is shown in Fig. 3, wherein a strip of metal 30 is interposed between the ends of the fabric and wherein the projecting warp pickets are abutted against opposite sides of the strip. While the ends of the fabric are so positioned with reference to the strip, soldering metal, in molten or gaseous form, is impinged against the strip. The pickets and the parts are thereby firmly united together. Neither the strip 30 nor the projecting warp pickets are previously coated with solder, and therefore, the metal of which the strip and fabric is made need not be subjected to a degree of heat, which is apt to burn it. The strip 30 is preferably placed on edge so as to present its wide faces to the ends of the warp pickets and preferably has a width which is slightly less than the distance between the top and bottom planes of the fabric.

A further modification of my invention is illustrated in Fig. 2, wherein the warp pickets are cut off close to the last weft wire at each end of the fabric, and wherein the last two weft wires 35 and 36 are positioned in contiguous engagement. While they are so held on the work table, metal in molten or gaseous form, is impinged thereagainst. A seam made in accordance with the modification of my invention is advantageous in that the necessity for accurate alignment of the warp pickets is obviated, and thus the seam can be quickly and readily made.

A further use for the apparatus, which is made in accordance with my invention is in the application of solder to the last weft wire for joining it to the warp wires preparatory to further treatment in connection with the making of a seam. There are special seams which necessitate a soldering operation at each end of the fabric before the joint is made. Fig. 5 illustrates a modification of my invention, wherein an acetylene flame is used in place of the electrically heated application. In Fig. 5, there is shown a central conduit 40 through which a metal in powder form is fed to the work. Surrounding the central conduit 40 are conduits 41 and 42, which conduct gas that is introduced through conduits 43 and 44 respectively. The outlets for all of the tubes are adjacent each other and provision is made for controlling the flow of gas by hand-operated valves, not shown, but located in the conduits 43 and 44 respectively. Similarly, the flow of powder may be controlled by the valve 29 at the lower end of the container 22. By adjusting the relative proportions of oxygen and acetylene, and the position and size of the flame a reducing flame can be obtained at the work. This practice is well known in the art of oxy-acetylene welding.

In Fig. 6, I have shown another modification of the applicator, wherein conduits 40 to 44 inclusive correspond to those shown in Fig. 5 and are correspondingly designated. The central conduit 40, however, is adapted to receive the metal in the form of a strip of wire 45 instead of in the form of powder, as previously illustrated. Furthermore, the plate 46 is disposed across the lower ends of the conduits 41 and 42 and is provided with converging outlets 47 for concentrating the flow of gas at the outlet. This construction melts the solder strip 45 progressively, as it is fed through the conduit 40.

A further modification of my invention is illustrated in Figs. 7 to 10 inclusive, in which the metal in powder form is held within a container 50, and is ejected in regulated quantities by means of an agitator.

In the preferred arrangement, shown in Figs. 7 to 10, the agitator comprises a coil 51, which may be energized by alternating current, and which acts upon an armature 52 that is free to move vertically under the action of electric impulses. The armature forms the upper end of an agitating rod 53, which extends through the container 50 and also through the restricted outlet 54 at the bottom of the container. The diameter of the rod is slightly less than the diameter of the passageway 54, so as to allow the metal, in powdered form, to flow therebetween whenever the rod is agitated. The clearance, however, is sufficiently small to prevent the flow of powder when the agitator is not in motion. Thus, the rod functions as a valve, and acts automatically to seal the outlet when the tool is not in operation. The current carrying leads for the coil are indicated at 55 and 56 in Fig. 7, as extending along the conduit 58, which functions as a handle for the tool, and also extend through a hand-operated switch which is indicated at 59.

To support the agitator in operating position, I have shown the container 50, as having an enlarged portion 60, in which the armature 52 is slidably mounted. The enlarged portion provides a shoulder against which the lower end of the compression spring 61 rests for supporting the upper end of the spring, which engages the bottom of the armature. The bottom end of another spring 62 engages the top of the armature, while the upper end of the spring 62 may extend into a recess within a plug 63. The plug in turn has a threaded engagement with a socket 64 in the end of a container extension 65 so that the tension on the springs may be adjusted, as desired. The springs operate to cushion and control the movement of the plunger during the vibrating action. The modification of Fig. 7 may be used for introducing heated gases in the region of the flowing metal. To this end, I have shown a head 70 that has gas conducting passageways 71, 72 and 73 respectively. A gas is conducted to all of the conduits through a common conduit 58, which as shown in Fig. 7, extends laterally from the container 50 at the point 75. The upper end of the conduit 72 terminates adjacent the point of connection 75 and operates to conduct gas downwardly to the central outlet 76. At points 77 and 78, branch conduits lead from the conduit 72 to conduits 71 and 73 respectively, so as to divert the flow of part of the gas into the conduits 71 and 73 respectively from whence it flows through outlets 80 and 81 respectively.

It is to be understood that in the case of an oxy-acetylene application, the mixed gases are individually controlled by hand-operated valves 82 and 83 in the respective conduits 84 and 85 which are connected to sources of gas supply. The conduits merge at points 86 into the conduit 58.

To facilitate movement of the applicator along the work, I have shown a pair of rollers 88 and 89, which are disposed in tandem relationship and adapted to rest upon the blocks 12 and to be guided thereby. The rollers are journalled in the forked ends of posts 90 and 91 respectively, the upper ends of which are threaded to receive nuts 92 and 93 respectively. A cross-bar 94 is attached to the head and has clearance openings through which the posts extend. The vertical position of the cross-bar and of the head therefor may be controlled by the adjustment of the nuts with respect to the posts.

The multiple gaseous outlets operate to preheat the work, to melt the solder, or other suitable metal that flows from the contaner 50, and then to remove any carbon deposit or resdue which might leave a blacked surface. As a result, one passage of tool across the work leaves a firmly made joint which has a clear unstained surface. The speed at which the tool is moved across the work is governed by the rate of flow of metal through the discharge passageway 53.

To assure a positive flow of the powdered metal, I have shown a vent opening 100 through which a gas may enter the container from the passageway 72. This maintains a slight pressure upon the powder so long as gas is flowing through the head.

All of the seams heretofore described can be made without the necessity for stitching wires and without the requirement for many operations that have heretofore been occasioned by the use of a closing wire. The impinging or spraying of metal onto the work while it is surrounded by a reducing gas has very greatly simplified the work in making a seam for Fourdrinier wires especially those having a relatively fine mesh. It is advantageous in that the excess solder is blown through the mesh openings, and hence the resulting seam will not clog the belt.

I claim:—

1. A joint for woven wire fabric having warp wires and weft wires, each end of the fabric having warp pickets associated therewith, the warp pickets being positioned in substantial alignment and in engagement with each other and the warp pickets on one end of the fabric being joined to those of the other solely by extraneous metal, which is applied thereto under pressure.

2. A joint for woven wire fabric comprising a strip of metal that is interposed between the ends of the fabric, and means comprising extraneous metal which is applied under pressure for joining the ends of the fabric to the strip.

3. A method of joining a weft wire to a plurality of warp wires in a woven wire fabric comprising impinging metal onto the weft wire under pressure, the relationship between the quantity of metal and the pressure being such that the metal envelops the weft wire and a portion of each warp wire without clogging the interstices of the fabric adjacent the weft wire.

4. A method of joining a weft wire to a plurality of warp wires in a woven wire fabric comprising impinging metal onto the weft wire under pressure while maintaining the space behind the fabric in the region of the weft wire open, whereby excess metal is blown through the interstices.

5. A method of making a seam for woven wire fabric comprising bringing the ends of the fabric into close proximity to each other, impinging metal onto the ends of the fabric under pressure and maintaining such relationship between the quantity of metal and the pressure that the metal will envelop the wires in the region of the seam while excess metal will be blown through the fabric so as to keep the interstices open.

6. A method of making a seam in woven wire fabric comprising joining at least one of the weft wires at each end of the fabric to the warp wires by impinging metal thereagainst through the medium of fluid under pressure so as to envelop the weft wire and a portion of each warp wire without clogging the interstices of the fabric, then bringing the ends together and joining them by the application of heat.

7. A joint for woven wire fabric having warp wires and weft wires wherein the last weft wire on each end of the fabric is joined as woven to the warp wires by extraneous metal which is applied under fluid pressure and which envelops the last weft wires and wherein the last weft wires are joined together in contiguous relationship by means of extraneous metal.

8. A joint for woven wire fabric, having warp wires and weft wires, wherein the last weft wires on the ends of the strip are disposed in contiguous relationship and means comprising pressure applied metal for joining the contiguous weft wires together, the pressure applied metal enveloping the weft wires without clogging the interstices of the fabric.

WALTER C. SUTTON.